E. S. SAVAGE.
COVER FOR ASH RECEPTACLES.
APPLICATION FILED MAY 24, 1919.
1,354,847.
Patented Oct. 5, 1920.
2 SHEETS—SHEET 1.
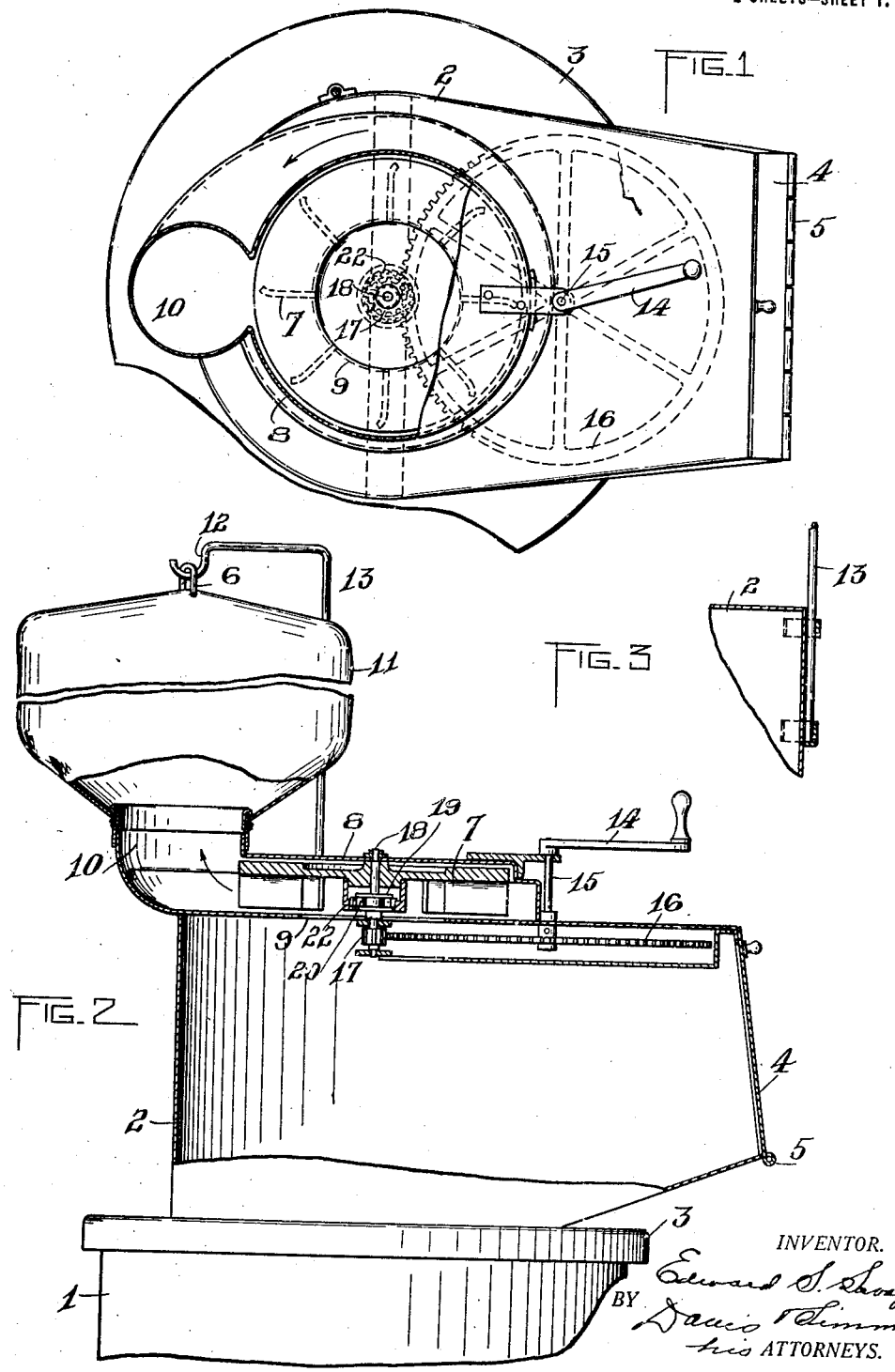

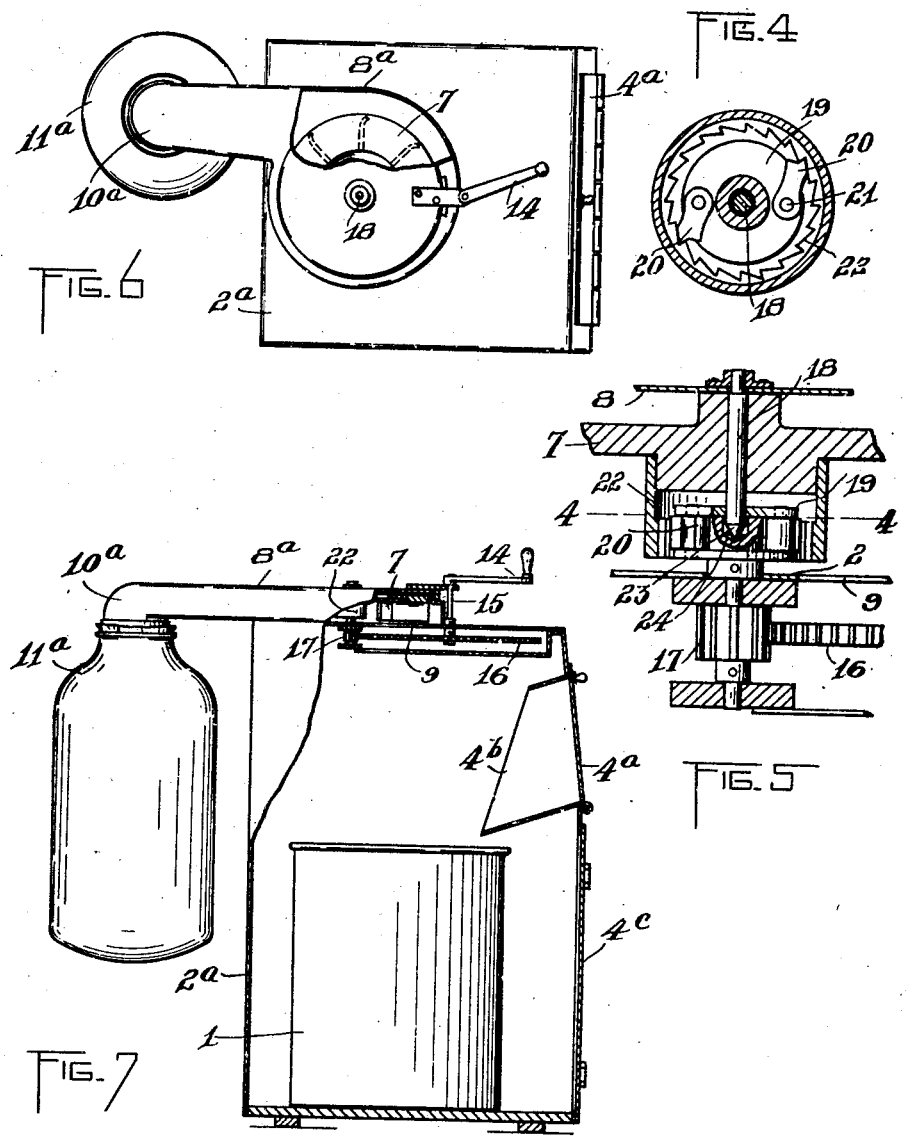

UNITED STATES PATENT OFFICE.

EDWARD S. SAVAGE, OF ROCHESTER, NEW YORK.

COVER FOR ASH-RECEPTACLES.

1,354,847.   Specification of Letters Patent.   Patented Oct. 5, 1920.

Application filed May 24, 1919. Serial No. 299,478.

*To all whom it may concern:*

Be it known that I, EDWARD S. SAVAGE, a citizen of the United States, and resident of Rochester, in the county of Monroe and State of New York, have invented certain new and useful Improvements in Covers for Ash-Receptacles, of which the following is a specification.

The present invention relates to covers for ash receptacles and an object of the invention is to provide a cover having means which will create a draft through the intake of the cover for the purpose of preventing the dust which arises from the can in depositing ashes therein, issuing from said intake. Another object of the invention is to provide a cover with a pneumatic dust collector which will create a draft through the intake for the purpose of collecting the rising dust from an ash in a screening receptacle.

To these and other ends, the invention consists of certain parts and combinations of parts all of which will be hereinafter described, the novel features being pointed out in the appended claims.

In the drawings:

Figure 1 is a view partially in section of a cover for ash cans constructed in accordance with this invention;

Fig. 2 is a side view of the construction shown in Fig. 1, partially in section;

Fig. 3 is a detail view showing the means by which the screening bag is supported from the cover;

Fig. 4 is a section on the line 4—4, Fig. 5 through the clutch;

Fig. 5 is a detail sectional view showing the clutch connection between the fan or blower and the driving mechanism;

Fig. 6 is a plan view of another embodiment partially in section; and

Fig. 7 is a side view of the embodiment shown in Fig. 6 partially in section.

Referring more particularly to the embodiment shown in Figs. 1 to 5 inclusive, 1 indicates the ash receptacle and 2 the cover casing which in this instance is provided with a flanged base portion 3 fitting the receptacle 1. The cover casing is provided in one side with a closure 4 hinged at its lower end at 5 and adapted to open the intake of the cover for the purpose of permitting the introduction of the ashes into the receptacle 1.

Associated with the cover is a means for creating a suction or draft through the intake. This means in this embodiment comprises a fan or blower 7 of the centrifugal type, mounted within a casing 8 surmounting the cover and having communication with the interior of the cover through an opening 9 arranged opposite the center of the fan. The fan casing is provided with an exhaust opening 10 over which a screen 11 preferably in the form of a bag is arranged, this bag being supported in an upright position preferably by an eye 6 at the top thereof connecting with the hook 12 on an arm 13 which is preferably secured to the cover 2 in the manner shown in Fig. 3.

The fan or blower may be driven in any suitable manner. In this instance a manually operable means is provided comprising a crank handle 14 upon a vertical shaft 15 which carries a large gear 16 meshing in turn with a pinion 17. This pinion has a clutch connection with the spindle 18 of the fan 7. In this instance, this clutch connection embodies a head 19 on which two centrifugally operated pawls 20 are pivoted at 21, said pawls being adapted to be thrown by centrifugal force into engagement with an internal ratchet wheel 22 which is carried by the fan 7 and surrounds the head 19. The spindle 18 of the fan 7 has a pointed end 23 which rests in a socket 24 in the head to form a step bearing for the fan.

In the operation of this embodiment of the invention, the closure 4 is opened for the purpose of depositing ashes in the can 1. Before the ashes are deposited, the handle 14 is turned to impart a rotary movement to the fan 7 thus creating a suction through the intake and out through the screened exhaust opening 10. When the ashes are deposited through the intake into the receptacle, the rising dust will be drawn away from the intake and discharged into the dust collecting bag 11. It is apparent that the clutch between the gearing and the fan permits the fan to race ahead of the gearing and to continue its rotation after the crank handle 14 has been released so as to give the one using the cover sufficient time in which to deposit ashes into the receptacle while the draft through the intake opening is present.

Referring to the embodiment shown in Figs. 6 and 7, the cover for the ash can or receptacle 1 is indicated at 2ª and entirely incloses the can having a door 4ª for closing the intake which is surrounded by a chute 4ᵇ for directing the ashes to the can 1. The ash can cover is provided below the door 4ᵃ with a closure 4ᶜ through which the can is introduced and removed from the cover. The cover is surmounted by a fan casing 8ᵃ which contains a suction fan 7 constructed and operated like the fan shown in the embodiment illustrated in Figs. 1 and 3. The discharge 10ᵃ of the fan casing 8ᵃ instead of opening upwardly opens downwardly and the screening bag 11ᵃ depends from this discharge instead of projecting upwardly therefrom as in Fig. 3. This embodiment of the invention operates like the embodiment shown in Figs. 1 and 3 in that it creates a draft through the intake and discharges the dust into a screening receptacle.

From the foregoing it will be seen that there has been provided a cover for an ash receptacle in which no dust passes from the cover due to the depositing of ashes in the receptacle. A dust collector is provided which creates a draft through the intake opening and discharges air through a screen discharge so that the dust is prevented from escaping from the cover. The suction producing means is of simple construction and easily operated. The operating means preferably is controlled by hand and initiates a movement in the fan, this movement being continued by momentum after the operating means is freed so that the operator is free to deposit ashes in the can during the running of the fan.

What I claim as my invention and desire to secure by Letters Patent is:

1. A cover for ash cans provided with an intake through which ashes are delivered to a can associated with the cover and provided also with an exhaust opening, and movable suction and blast producing means associated with the cover and arranged to operate between the intake and the exhaust opening for drawing air inwardly through said intake opening and discharging such air through the exhaust opening.

2. A cover for ash cans provided with an intake opening through which the ashes are delivered to a can associated with the cover and provided also with a screened exhaust opening, and movable suction and blast producing means associated with the cover and arranged between the intake and the screened exhaust for drawing air inwardly through the intake opening and discharging such air through the screened exhaust.

3. A cover for ash cans provided with an intake opening through which ashes are fed to a can associated with the cover and provided also with an exhaust opening, and a fan arranged to draw air through the intake and discharge the same through the exhaust opening.

4. A cover for ash cans provided with an intake through which ashes are delivered to a can associated with the cover and provided also with a porous dust collecting receptacle providing a screened exhaust, and a fan arranged to draw air through the intake and discharge the dust ladened air into the dust collector.

5. A cover for ash cans having an intake for the ashes and a screened exhaust opening, and provided with a fan arranged to create a suction through the intake, and means for driving the fan, having a clutch connected with such fan to permit the fan to rotate freely after its motion has been initiated.

EDWARD S. SAVAGE.